(12) United States Patent
Ståhlberg et al.

(10) Patent No.: US 8,931,100 B2
(45) Date of Patent: Jan. 6, 2015

(54) DISINFECTION OF A FILE SYSTEM

(75) Inventors: Mika Ståhlberg, Espoo (FI); Mikko Hyppönen, Helsinki (FI); Kimmo Kasslin, Espoo (FI); Veli-Jussi Kesti, Espoo (FI); Kai Nyman, Helsinki (FI); Timo Harmonen, Nummela (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 13/325,276

(22) Filed: Dec. 14, 2011

(65) Prior Publication Data

US 2013/0160124 A1  Jun. 20, 2013

(51) Int. Cl.
G06F 11/00 (2006.01)
G06F 12/14 (2006.01)
G06F 12/16 (2006.01)
G08B 23/00 (2006.01)

(52) U.S. Cl.
USPC ................................. 726/24; 726/22; 726/23

(58) Field of Classification Search
CPC ..... G06F 21/56; G06F 21/561; G06F 21/568; G06F 21/554
USPC .......................................................... 726/24
See application file for complete search history.

(56) References Cited

U.S. PATENT DOCUMENTS

| 8,104,090 | B1* | 1/2012 | Pavlyushchik | 726/24 |
| 2002/0116542 | A1* | 8/2002 | Tarbotton et al. | 709/318 |
| 2006/0137010 | A1* | 6/2006 | Kramer et al. | 726/22 |
| 2007/0250928 | A1* | 10/2007 | Boney | 726/24 |
| 2012/0079596 | A1* | 3/2012 | Thomas et al. | 726/24 |
| 2012/0102568 | A1* | 4/2012 | Tarbotton et al. | 726/23 |

OTHER PUBLICATIONS

WhitPhil, Tech Support Guy, Dec. 26, 2001, http://forums.techguy.org/earlier-versions-windows/62947-changing-passwords-after-trojan-virus.html.*
Kim Komando, Tech tip: Change passwords if you find keylogger, Jun. 10, 2011, http://usatoday30.usatoday.com/tech/columnist/kimkomando/2011-06-10-ask-kim_n.htm.*

* cited by examiner

Primary Examiner — Andrew Nalven
Assistant Examiner — Khang Do
(74) Attorney, Agent, or Firm — Harrington & Smith

(57) ABSTRACT

A method for determining appropriate actions to remedy potential security lapses following infection of a device by malware. Following detection of infection of the device the device undergoes a cleaning operation. As part of the cleaning operation infected electronic files and any other associated files or objects are removed from the device. From timestamps associated with the infected files and associated files and objects, either directly or from another source such as an anti-virus trace program, the time of infection can be estimated. This allows the system to reference timestamps on the device to determine the source of the infection. Additionally, if the type of infection is identified timestamps on the device can be used to determine where there are particular areas of vulnerability due to user actions on the device.

12 Claims, 3 Drawing Sheets

DISINFECTION OF A FILE SYSTEM

FIELD OF THE INVENTION

The invention relates to the field of disinfection of a file system.

BACKGROUND

Malware is short for malicious software and is used as a term to refer to any software designed to infiltrate or damage a computer system without the owner's informed consent. Malware can include computer viruses, worms, trojan horses, rootkits, adware, spyware and any other malicious and unwanted software. Any client device, such as a desktop personal computer (PC), laptop, tablet or mobile phone, can be at risk from malware.

Infection of a device by malware may not be detected immediately as many users do not use anti-virus software to detect and possibly remove malware on their devices. Furthermore, even if a user does make use of anti-virus software there is still a possibility that the malware is not known to the anti-virus software and therefore the software will not detect infection of a computer system.

During the time between infection of a device by malware and its detection and removal malware present on the device is able to perform actions to infiltrate or damage the device without the user's knowledge. Hence, it is important that not only is the user able to remove malware from a device they are able to mitigate any damage caused by the malware.

SUMMARY

According to a first aspect of the present invention there is provided a method comprising the steps of: at a device, scanning the file system to identify an infected electronic file, determining an estimated time when the device was likely to have been infected, comparing the estimated time to timestamps of events on the device, determining events occurring on the device at the estimated time and determining the source of the infection from events occurring on the device at the estimated time. This enables a user to be informed of the time and source of any infection in order that they can take appropriate action to minimise any harm caused by the infection.

For example, if the source of infection is a removable drive to scan the removable drive and remove the malware from the removable drive. Additionally, determining the source of infection also enables a user to avoid the source of infection, for example, if the source is a particular website, thereby preventing repeat infection of the device.

The estimated time may be the time that a malicious electronic file was introduced to or executed by the device, or the time an electronic file was infected by malicious software.

Determining the estimated time may include generating a list of time stamps associated with the infected electronic file. These timestamps may be the timestamps of the infected electronic file and/or timestamps of related registry keys or timestamps of files or registry keys related to the infected electronic file.

The list of timestamps may be filtered to remove any timestamps which cannot be the time of infection of the file. Timestamps which may be removed are timestamps placed in the future, timestamps for files which do not relate to access points for infection, timestamps for registry values which are not launchpoints, timestamps for registry values that do not disable security functionality. This means that only timestamps for files or registry keys which may relate to the source of infection to be cross-referenced to timestamps of events occurring on the device resulting in quicker identification of the estimated time and potential source of infection.

The estimated time may alternatively be determined by querying a trace log of a tracing application running on the device; examples of such tracing applications are an anti-virus application, online backup application or sync applications. This is advantageous as the timestamps associated with logs in these applications will be accurate, whether they relate to a network clock, a device clock or both. The use of such a log means that an accurate time for the alteration of the infected electronic file can be identified without requiring any further timestamp analysis outside the timestamps in the trace log.

Timestamps of events on the device may be timestamps associated with a web browser log, timestamps associated with a web browser cache, timestamps associated with a firewall log, timestamps associated with a list of contacted IP addresses, timestamps associated with a list of file names or any other suitable source.

The infected electronic file may be analyzed to determine the type of infection or the actions of the infection on the device. By determining the type of infection the advice to a user on what actions to take to mitigate security risks can be tailored to the type of infection. Analyzing the infected electronic file may include the step of determining characteristics of the infected electronic file such as the presence of banking strings or browser hooks, maintaining open ports, maintaining a connection to a control server, performing keylogging or file system activity.

An appropriate action to be undertaken by the user may be determined from the type of infection. This allows targeted action by the user in response to the type of malware present on the device.

Optionally, the method may include the step of determining relevant events on the device between the time of infection and the time of detection. By determining relevant events on the device the system can filter out any actions which it deems unnecessary. For example, presence of a particular type of malware may have a recommended set of actions to be taken. However, these actions may not need to be carried out in their entirety if, a particular website or application has not been accessed after the estimated time of infection. For example, if the malware is a banking Trojan the user will not need to check bank accounts for accounts they have not accessed on the device after the estimated time of infection.

These relevant events may be determined by analyzing a web browser log or file registry for events occurring between the estimated time of infection and the time of removal of the infected electronic file from the device.

According to a second aspect of the present invention there is provided a method comprising the steps of at a device, scanning the file system to identify an infected electronic file, determining an estimated time when the infected electronic file was likely to have been infected, analyzing the infected electronic file to determine the type of infection and determining appropriate action to be undertaken by the user from the type of infection.

By determining the type of infection present on the device the user of a device can be informed of actions they should take to mitigate any damage caused by the malware that infected the device without requiring any knowledge about malware. This has the additional advantage that the actions can be specific to the type of malware meaning that unnecessary actions by the user need not be taken. For example, if the malware is identified as being a banking Trojan the user need only take action with reference to their bank accounts. They need not change passwords for any other services such as email accounts. The actions needing to be taken by the user may be further narrowed by analysing device logs and registries to determine relevant events that the user has taken since the estimated time of infection. Returning to the example of the banking Trojan, this means that the user need only change passwords and check account details for bank websites accessed on the device since the estimated time of infection; accounts on bank websites which have not been accessed since the estimated time of infection need not be reviewed by the user.

According to a third aspect of the present invention there is provided a computing device, comprising: at least one processor; and at least one memory including computer program code, the at least one memory and the computer program code configured to, with the at least one processor, cause the device to perform at least the following: scan a file system in the memory to identify an infected electronic file, determine an estimated time when the file system was likely to have been infected, compare the estimated time to timestamps of events on the device, determine events occurring on the device at the estimated time and determine the source of the infection from events occurring on the device at the estimated time.

Optionally, the device may be further configured to generate and filter a list of time stamps associated with the infected electronic file by at least one of the following: removing timestamps placed in the future, timestamps for files which do not relate to access points for infection, timestamps for registry values which are not launchpoints, timestamps for registry values that do not disable security functionality. This means that only timestamps for files or registry keys which may relate to the source of infection to be cross-referenced to timestamps of events occurring on the device resulting in quicker identification of the estimated time and potential source of infection.

According to a fourth aspect of the present invention there is provided a computing device, comprising: at least one processor; and at least one memory including computer program code, the at least one memory and the computer program code configured to, with the at least one processor, cause the device to perform at least the following: scan a file system in the memory to identify an infected electronic file, determine an estimated time when the file system was likely to have been infected; analyze the infected electronic file to determine the type of infection, determine events relevant to the type of infection which have occurred on the device after the estimated time and determine, from the determined events and type of infection, appropriate action to be undertaken by the user.

Determining events relevant to the type of infection which have occurred on the device after the estimated time may include analyzing timestamps of events on the device. The timestamps of events on the device which are analyzed may be one or more of: timestamps associated with a web browser log, timestamps associated with a web browser cache, timestamps associated with a firewall log, timestamps associated with a list of contacted IP addresses, timestamps associated with a list of file names.

According to a fifth aspect of the present invention there is provided a computer program, comprising computer readable code which, when run on a computer device, causes the computer device to perform the method described above in the first aspect.

According to a sixth aspect of the present invention there is provided a computer program, comprising computer readable code which, when run on a computer device, causes the computer device to perform the method described above in the second aspect.

According to a seventh aspect of the present invention there is provided a computer program product comprising a computer readable medium bearing a computer program code embodied therein for use with a computer, the computer program code comprising: code for scanning the file system to identify an infected electronic file, code for determining an estimated time when the file system was likely to have been infected, code for comparing the estimated time to timestamps of events on the device, code for determining events occurring on the device at the estimated time and code for determining the source of the infection from events occurring on the device at the estimated time.

According to an eighth aspect of the present invention there is provided a computer program product comprising a computer readable medium bearing a computer program code embodied therein for use with a computer, the computer program code comprising: code for scanning the file system to identify an infected electronic file, code for determining an estimated time when the file system was likely to have been infected, code for analyzing the infected electronic file to determine the type of infection, code for determining events relevant to the type of infection which have occurred on the device after the estimated time and code for determining, from the determined events and type of infection, appropriate action to be undertaken by the user.

DETAILED DESCRIPTION OF CERTAIN EMBODIMENTS

Figure 1:
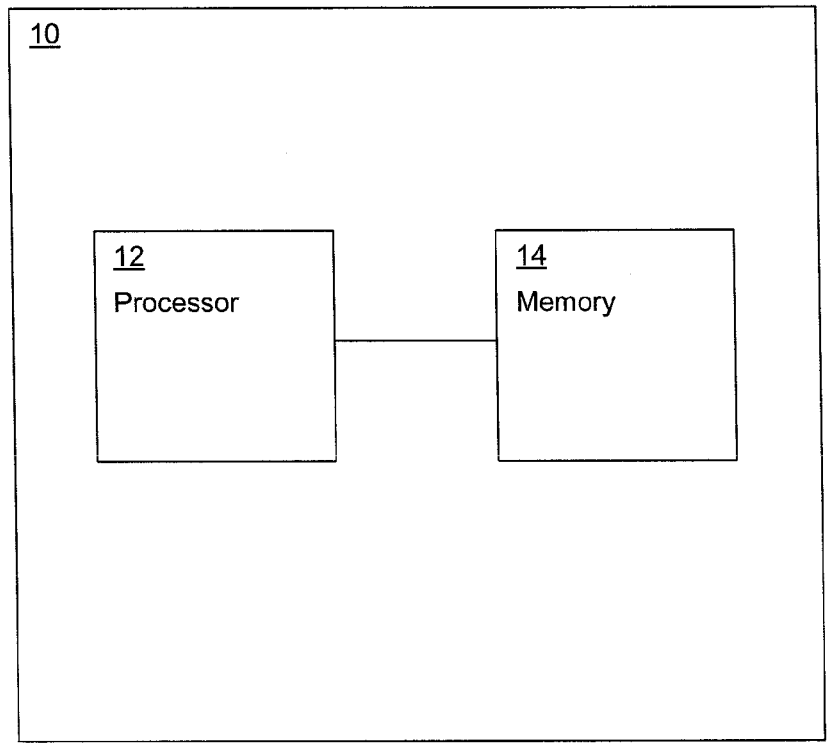
FIG. 1 is a flow diagram illustrating a mechanism for identifying the source of an infection in a file system

FIG. 1 illustrates a client device 10 which includes a memory 12 at which a plurality of electronic files are stored and a processor 14.

Figure 2:
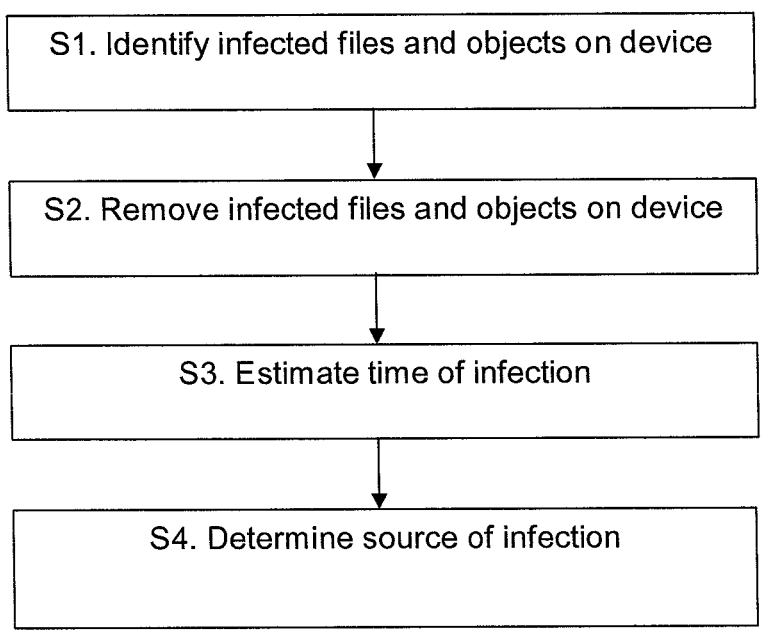
FIG. 2 is a flow diagram illustrating a mechanism for enabling a user to mitigate the effects of an infection in a file system.

Referring now to FIG. 2 there is illustrated a process which is executed by the processor 14 when malware is detected on the device 10 to determine the time and source of the infection. In the event that malware is detected on a device the user elects to run a process in step S1 to detect the malware files and any other malicious objects which may be present on the device (for example, registry keys and values). The process may take the form of an anti-virus scan, a cloud look-up or may be done heuristically and may include one or more of the steps of: checking to see which IP addresses processes and modules on the device are connecting to in order to determine whether the IP addresses are for known or suspected malware sites; checking to see which processes and modules are sending emails and comparing to, for example, a list of known email clients; and checking which processes and files are known to be clean by backend processes.

Once the malware files and objects have been identified they can be removed from the device using any suitable method as in S2. Preferably, files and objects, such as registry keys and values, which are linked together by relationships to the infected file or object are removed in one go.

Upon identification of malware the time of infection of the device by the malware is estimated S3.

The time of infection may be estimated by collecting the timestamps of infected files and any associated files and objects e.g. related registry keys.

The collected timestamps may then be filtered to remove any inaccurate timestamps or timestamps for files or registry values which would not be the source of infection. For example, where the timestamp occurs in the future or is 1.1.1970, the system can determine that the timestamp is corrupted and remove the timestamp from consideration for the estimated time of infection.

Timestamps for file types, such as data files and log files, which cannot be the source of the infection of the device may also be disregarded. Additionally, if the registry value is not a launch point associated with the malware, a value that disables security functionality or any other modification which is dangerous to the operation of the device the timestamp of the registry value may be disregarded.

In this way the list of timestamps which may indicate the time of infection can be reduced.

The system may then reference the filtered list of time stamps against timestamps for events occurring on the device. The timestamps may be located, for example, in the device's web browser history, operating system registry and prefetch history etc. . . . , and relate to events which are associated with infection of devices such as accessing a website or reading emails. Timestamps for relevant events can be compared to the filtered list of timestamps to identify the estimated time of infection of the device.

In the event that a device had a tracing application, such as an anti-virus program, running at the time that the infection of the device took place there is no need to generate a filtered list of timestamps as described above. Rather, a trace of the events within the device and parent-child relationships can be parsed during cleaning of the device to identify what events occurred on the device at what time. As tracing software will include accurate time stamps, related to the local clock, network time services or both, for events taking place on the device and these timestamps can be used to accurately identify the time of the infection of the device by the malware.

The tracing application may, for example, identify the time of infection by referencing the list of infected objects removed during cleansing of the device with the trace log to identify the time stamp when the infection took place.

Once the time of the infection has been estimated the system parses through one or more of the device's web browser logs, operating system registries, emails and file system to determine any events which occurred on the device at or around the time of the infection timestamp in Step S4.

For example, the user may have read an email or visited a website at the estimated time of infection. By identifying events occurring on the device at the time of the infection the source of the infection may be identified. In this way the user can be informed of the source of and/or action which resulted in the malware infection.

Where the time of infection is identified by comparing a filtered list of timestamps to timestamps for events occurring on the device the system may concurrently determine the estimated time of infection and the source of the infection.

Figure 3:
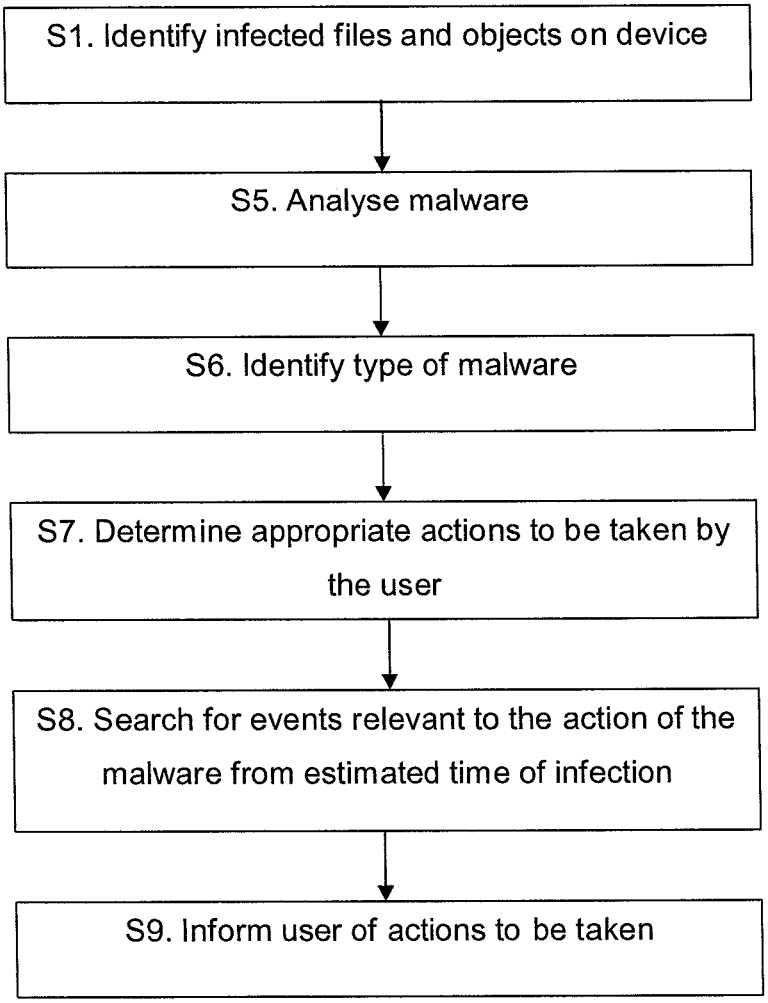
FIG. 3 is a flow diagram illustrating a mechanism for analysing malware and informing a user of actions to be taken.

With reference to FIG. 3, once the malware has been identified it can be analyzed (step S5) to determine the actions of the malware on the device. This may be achieved by analyzing the removed files and registry keys along with log files in the malware directories. Alternatively, the malware may be run in a sandbox environment and the actions of the malware observed.

From the actions or properties of the malware the type of malware can be identified (step S6). For example, the presence of banking strings and browser hooks indicates banking Trojan activity; open ports or connections to control servers indicate backdoor functionality; the presence of hooks indicates keylogging capability; file system activity can be analyzed to identify data stealing or ransomware Trojans; and the presence of scareware features, keylogging features, or the collection of credit card information can indicate a Trojan-spy stealing credit card information.

Once the type of malware has been identified the system can determine in S7 relevant actions to be taken by the user to mitigate any damage caused by the infection of the device and inform the user of these actions. For example, if the malware was determined to be a banking Trojan the user will be instructed to check their account balance and change the password.

Preferably, the system also searches for any relevant events which have taken place since the time of infection (step S8). These events may include accessing websites or launching an application on the device. Once the relevant events have been identified the user can be informed of steps that they should take to mitigate any damage (step S9).

For example, in the instance of the banking Trojan the system may search any web browser logs or caches on the device for banking websites which have been accessed since the estimated time of infection. The user can then be informed of these banking websites and will only need to check the account balance and change the password for these banking websites.

Another example is where the malware is a key logger. In this instance the system instructs the user to change every password used during the period of infection. This may involve the system compiling a list of websites which have been visited since the time of infection. Additionally, the system may compile a list of installed applications which have been launched since the time of the infection (the launch date of an installed application may be found, for example, in the registry or the prefetch data).

In the event that the malware is a key logger or a credit card information stealing Trojan the system may instruct the user to check their credit card bill or contact the credit card company to check whether the card needs to be cancelled.

Alternatively, if the malware is identified as being a spam tool or an email worm the system instructs the user to inform other users in their contact list who have received malicious emails.

Finally if the malware is identified as coming from a removable drive on the device such as a USB stick or memory card the user can be instructed to find the drive and to clean the malware from the drive. They may also be instructed to check every other device which the removable drive has been connected to.

Additionally, the user may be instructed to restore any removed files from back-ups. The user may also be instructed to run a vulnerability scan and to install any appropriate applications, such as an anti-virus application, to provide additional security.

One skilled in the art will understand that these recommended actions are provided by way of example only and any suitable actions may be recommended to the user.

The analysis of any logs or data on the device can be performed either on the client itself or remotely, for example in a device in a cloud. One skilled in the art will also understand that the process steps illustrated in FIGS. 2 and 3 may take place in any suitable order and may, where appropriate, be run concurrently either on the device or in the cloud.

Examples of logs which may be examined on a Windows operating system are web browser histories, prefetch logs, registries, email history and application specific histories such as a Java cache.

With reference to web browser histories, all web browsers have a history feature and cache downloaded web content. The local web browser history of the device and/or the cached web content may be reviewed to locate the timestamp of the infection or to identify the source of an infection based upon a time stamp. This may be achieved by parsing the browsing history and extracting URL-time of visit pairs for analysis.

The prefetch log in the Windows operating system stores data used by the application in order to speed up loading of applications on the device. The data is stored with a time of last execution of the application which enables the system to determine whether an application has been executed within a period of infection.

The UserAssist registry key records all the programs run on a Windows operating system, the date and time each program was last run and how many times the program has been run. Thus, the previous runtime of an application may be viewed by referencing the UserAssist registry key.

MUICache records applications which have been run on a device by writing the application name to its registry when a new application is run. The timestamp associated with an application may be reviewed to determine that an application has been run on the device.

As will be understood by one skilled in the art the invention may be applied on any operating system and these logs are provided by way of example only. Additionally, the system may not analyze the contents of all logs available on a device but may select to view a subset of logs.

The invention claimed is:

1. A method comprising:
    at a device, scanning a file system to identify an infected electronic file;
    determining an estimated time when the file system was likely to have been infected, comprising:
    generating a list of timestamps associated with the infected electronic file;
    filtering the list of timestamps by at least one of the following:
        removing timestamps placed in the future,
        removing timestamps for files which do not relate to access points for infection,
        removing timestamps for registry values which are not launchpoints,
        removing timestamps for registry values that do not disable security functionality;
    comparing the filtered timestamp list to timestamps of events on the device;
    analyzing the infected electronic file to determine the type of infection;
    when it is determined that the type of infection is a banking Trojan, searching any web browser logs or caches on the device to identify banking websites that have been accessed since the estimated time of infection;
    informing a user of the identified banking websites;
    comparing the estimated time to timestamps of events on the device, where the timestamps of events on the device comprise one or more of the following:
    timestamps associated with a web browser log,
    timestamps associated with a web browser cache,
    timestamps associated with a firewall log,
    timestamps associated with a list of contacted IP addresses,
    timestamps associated with a list of file names;
    determining events occurring on the device at the estimated time; and
    determining a source of the infection from events occurring on the device at the estimated time.

2. The method of claim 1 wherein the determining an estimated time comprises querying a log of a tracing application running on the device.

3. The method of claim 1 wherein the analyzing the infected electronic file includes determining characteristics of the infected electronic file.

4. The method of claim 3 wherein the characteristics of the infected electronic file are banking strings, browser hooks, maintaining open ports, maintaining a connection to a control server, performing keylogging or file system activity.

5. The method of claim 1 further comprising determining relevant events on the device between the estimated time and the time the infected electronic file is identified.

6. The method of claim 5 wherein the determining relevant events comprises analyzing a web browser log or file registry for events occurring between the estimated time of infection and a time of removal of the infected electronic file from the device.

7. A method according to claim 1 and comprising instructing the user to check account data for the identified banking websites and to change passwords.

8. A non-transitory computer readable medium comprising a computer program, comprising computer readable code which, when run on a computer device, causes the computer device to perform the method of claim 1.

9. A computing device, comprising: at least one processor; and at least one non-transitory memory including computer program code, the at least one non-transitory memory and the computer program code configured to, with the at least one processor, cause the device to perform at least the following:
    scan a file system in the non-transitory memory to identify an infected electronic file;
    determine an estimated time when the file system was likely to have been infected by:
    generating a list of timestamps associated with the infected electronic file;
    filtering the list of timestamps by at least one of the following:
        removing timestamps placed in the future,
        removing timestamps for files which do not relate to access points for infection,
        removing timestamps for registry values which are not launchpoints,
        removing timestamps for registry values that do not disable security functionality;
    comparing the filtered timestamp list to timestamps of events on the device; and
    analyze the infected electronic file to determine the type of infection;
    when it is determined that the type of infection is a banking Trojan, search any web browser logs or caches on the device to identify banking websites that have been accessed since the estimated time of infection;
    inform the user of the identified banking websites;
    compare the estimated time to timestamps of events on the device, where the timestamps of events on the device comprise one or more of the following: timestamps associated with a web browser log, timestamps associated with a web browser cache, timestamps associated with a firewall log, timestamps associated with a list of contacted IP addresses, timestamps associated with a list of file names;

determine events occurring on the device at the estimated time; and determine a source of the infection from events occurring on the device at the estimated time.

10. A non-transitory computer program product comprising a computer readable medium bearing a computer program code embodied therein for use with a computer, the computer program code comprising:

code for scanning the file system to identify an infected electronic file;

code for determining an estimated time when the file system was likely to have been infected, including:

code for generating a list of timestamps associated with the infected electronic file;

code for filtering the list of timestamps by at least one of the following:

code for removing timestamps placed in the future, code for removing timestamps for files which do not relate to access points for infection, code for removing timestamps for registry values which are not launchpoints, code for removing timestamps for registry values that do not disable security functionality;

code for comparing the filtered timestamp list to timestamps of events on the device;

code for analyzing the infected electronic file to determine the type of infection;

code for searching any web browser logs or caches on the device to identify banking websites that have been accessed since the estimated time of infection, when it is determined that the type of infection is a banking Trojan; and code for informing the user of the identified banking websites;

code for comparing the estimated time to timestamps of events on the device, where the timestamps of events on the device comprise one or more of the following: timestamps associated with a web browser log, timestamps associated with a web browser cache, timestamps associated with a firewall log, timestamps associated with a list of contacted IP addresses, timestamps associated with a list of file names;

code for determining events occurring on the device at the estimated time; and code for determining a source of the infection from events occurring on the device at the estimated time.

11. A method comprising:

at a device, scanning a file system to identify an infected electronic file;

determining an estimated time when the file system was likely to have been infected by:

generating a list of timestamps associated with the infected electronic file;

filtering the list of timestamps by at least one of the following:

removing timestamps placed in the future, removing timestamps for files which do not relate to access points for infection, removing timestamps for registry values which are not launchpoints, removing timestamps for registry values that do not disable security functionality;

comparing the filtered timestamp list to timestamps of events on the device and;

analyzing the infected electronic file to determine what type of infection;

when it is determined that the type of infection is a key logger, compiling a list of websites that have been visited since the estimated time of infection; and instructing a user to change every password used since the estimated time of infection;

comparing the estimated time to timestamps of events on the device, where the timestamps of events on the device comprise one or more of the following: timestamps associated with a web browser log, timestamps associated with a web browser cache, timestamps associated with a firewall log, timestamps associated with a list of contacted IP addresses, timestamps associated with a list of file names;

determining events occurring on the device at the estimated time; and determining a source of the infection from events occurring on the device at the estimated time.

12. A method according to claim 11 and comprising, if it is determined that the type of infection is a key logger, compiling a list of applications that have been launched since the estimated time of infection.

* * * * *